United States Patent Office
3,553,175
Patented Jan. 5, 1971

3,553,175
BETA LACTONE-POLYISOCYANATE
CASTING COMPOSITIONS
Klaas Ruyter, Amsterdam, Netherlands, assignor to Shell Oil Company, New York, N.Y., a corporation of Delaware
No Drawing. Filed Dec. 9, 1968, Ser. No. 782,487
Claims priority, application Netherlands, Jan. 10, 1968, 1,400
Int. Cl. C08g 22/08, 22/34
U.S. Cl. 260—77.5
12 Claims

ABSTRACT OF THE DISCLOSURE

Compositions are disclosed comprising (1) an $\alpha,\alpha$-dialkyl-$\beta$-lactone, (2) one or more organic polyisocyanate and (3) an anionic initiator containing (a) an atom from the group consisting of nitrogen, phosphorus, arsenic, sulfur, selenium or tellurium, and (b) at least 2 separate bonds between said atom and a carbon atom of an organic radical, which compositions are curable to tough hard products.

BACKGROUND OF THE INVENTION

Lactones generally are useful organic compounds for a variety of purposes. They are, for example, employed as ingredients in perfumes, and are known to have physiological activity resulting in their use in pharmaceuticals. Such beta lactones as pivalolactone are, because they are highly reactive substances, worthwhile as intermediates for a wide variety of syntheses. They may also be polymerized to useful resinous products.

It is known that an organic polyisocyanate (the term "organic polyisocyanate" as used herein, refers to an organic compound soluble in lactone and containing two or more —N=C=O groups) can be reacted with $\beta$-propiolactone in the presence of a tertiary amine. The resulting product is not stable, however; carbon dioxide is generated. When $\beta$-propiolactone is copolymerized with $\gamma$-butyrolactone or $\delta$-valerolactone under the same conditions, viscous low-molecular-weight copolymers are obtained.

It has also been proposed to purify $\beta$-lactones, in particular pivalolactone, with up to 10% by weight (%w.) of an organic isocyanate, preferably in the presence of a metal compound which is a catalyst for the preparation of polyurethanes such as bismuth nitrate. The lactone purified from hydrogen-active compounds such as water, may be distilled substantially without losses due to polymerization.

STATEMENT OF THE INVENTION

Surprisingly, it has now been discovered that in the presence of a certain class of initiators, mixtures containing an alkyl-substituted $\beta$-lactone and one or more organic polyisocyanates may be polymerized and cured to products which are hard and tough and having in addition other desirable properties as will be hereinafter apparent.

The invention relates to a curable composition comprising a lactone, an organic polyisocyanate and an anionic initiator, the ratio between the numbers of lactone and isocyanate groups being between 1:10 and 10:1. For the sake of brevity said ratio between the numbers of lactone and isocyanate groups will be referred to hereinafter as "equivalent ratio." Depending upon this ratio, the cured products possess different properties, as will be hereinafter discussed, particular ratios are selected to obtain desirable properties of clarity, hardness, softening temperature and the like. The lactone/polyisocyanate compositions may therefore be advantageously employed in a wide variety of applications as, e.g., potting and castings; manufacture of building materials such as fiberboard, hardboard, floors; soil impregnation; road building; and the like.

The invention further relates to the compositions after they have been cured and objects comprising these compositions.

DESCRIPTION OF THE PREFERRED EMBODIMENT

According to the invention a curable composition is provided, comprising an $\alpha,\alpha$-dialkyl-$\beta$-lactone and an organic polyisocyanate in an equivalent ratio between 1:10 and 10:1, and—in addition—an anionic initiator which (a) is a compound containing an atom of an element of Group V–A or VI–A of the Periodic Table of the Elements, which atom has an oxidation state of not more than 4, an electronegativity of not more than 3.2 and an atomic number between 7 and 52; and (b) contains at least 2 separate bonds between said atom and a carbon atom of an organic radical.

The concept of electronegativity is fairly well established in chemical idiom (cf. L. Pauling, The Nature of the Chemical Bond, 1960, page 93). It will be noted that oxygen is specifically excluded since it has an electronegativity of 3.5; ethers such as diethyl ether will not function as initiators, while sulfides do. For example, dibutylsulfide is an excellent initiator.

Thus, the initiator contains an atom of the elements nitrogen, phosphorus, arsenic, antimony, sulfur, selenium or tellurium. Preferably, the initiator contains an atom of trivalent nitrogen or phosphorus, or of divalent sulfur. Suitable initiators are, e.g., triphenylphosphine, diisopropylamine, tributylamine, $\alpha$ - methylbenzyl - dimethylamine, triphenylarsine, triphenylstibine, dibutylsulfide, di-isopropylselenide, diethyltelluride, dimethylsulfoxide, dimethylformamide, morpholine, pyridine, N-ethylpiperidine, 1 - butyl - 2 - phospholidine, 9 - phenyl - 9 - phosphabicyclo[4,2,1]nonane, tetrahydrothiophene and pentamethylenesulfide.

A preferred class of initiators is formed by those initiators which are free of active hydrogen. Suitable initiators of this call containing a Group V–A element, may have the general formulae:

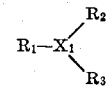

or—less preferred

in which $X_1$ represents the Group X–A element, preferably nitrogen or phosphorus; $R_1$, $R_2$ and $R_3$ represent an organic radical having 1 to 12 carbon atoms bound to $X_1$ by a C—$X_1$ bond, while $R_1$ and $R_2$ together may also form a divalent organic radical; and A represents a divalent organic radical such as a butadienylene radical. Suitable initiators of the said class containing a Group VI–A element, may have the general formula

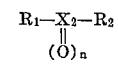

in which $X_2$ represents the Group VI–A element, preferably sulfur; $R_1$ and $R_2$ have the meanings indicated hereinabove; O is oxygen; and $n$ is 1 or zero, preferably zero.

The organic radicals $R_1$, $R_2$ and $R_3$—if present—advantageously contain hydrogen and carbon only such as in phenyl, tolyl, xylyl, benzyl, methyl, ethyl, butyl and the like. Divalent organic radicals formed by $R_1$ and $R_2$ together, are, e.g., tetra- or pentamethylene or the radical having the formula $-CH_2-CH_2-O-CH_2-CH_2-$.

Preferred classes of initiators are:

(a) tertiary phosphines such as triphenylphosphine, and 1-phenylphospholidine;
(b) aliphatic tertiary amines especially those having at least 2 alkyl groups of not more than 4 carbon atoms each such as tributylamine and α-methylbenzyl-dimethylamine;
(c) aliphatic sulfides and sulfoxides such as dibutyl sulfide and dimethylsulfoxide. A particularly useful initiator in this class is tetrahydrothiophene.

Suitable α,α-dialkyl-β-propiolacetones are those having the formula:

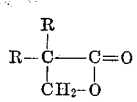

wherein the hydrogen atoms of the β-carbon atom are not replaced by other atoms or groups and wherein the alkyl groups have 1–4 carbon atoms each, such as α-methyl-α-ethyl-β-propiolactone, α,α - diethyl - β - propiolactone, α-methyl-α-butyl-β-propiolactones, α,α-dibutyl - β - propiolactone and the preferred α,α-dimethyl-β-propiolactone or pivalolactone. The lactone is preferably purified before being mixed with the polyisocyanate, e.g., by distillation over calcium hydride, phosphoric acid or an isocyanate, or by azeotropic distillation with toluene in order to remove any water present. It is desirable that this purification be carried out directly before use of the lactone.

The organic polyisocyanate used is preferably an aromatic diisocyanate, such as 2,4- and 2,6-toluene diisocyanate, diphenyl methane-4,4'- diisocyanate, dianisidine diisocyanate, metaphenylene diisocyanate and tolidine diisocyanate. Excellent results have been obtained with 2,4- and 2,6-toluene diisocyanates, especially with 85/15–60/40 mixtures thereof. If aliphatic polyisocyanates are used as polyisocyanate, it is desirable to do so in admixture with an aromatic polyisocyanate. Suitable weight ratios of aliphatic/aromatic polyisocyanates are below about 10:1, e.g., 3:1.

The organic polyisocyanate may also be a higher molecular weight derivative of a lower molecular weight polyisocyanate, e.g., the polytrimerisation products of toluene diisocyanate or diphenylmethane diisocyanate still containing a plurality of isocyanate groups (cf. e.g., Journal of Applied Polymer Science, 1967, pages 811–815). Other suitable derivatives are those obtainable by reacting a polyol with a diisocyanate, e.g., toluene diisocyanate with trimethylolpropane, in proportions of 1.3–1.7 isocyanate groups per hydroxyl group of the polyol, as described, e.g., in U.S. 2,855,421. Removal of volatile constituents from the reaction products may be effected by the method described in British Pat. 930,458.

Before or during mixing of the components of the composition according to the invention, or as soon as possible thereafter, it is desirable to devolatilize it, e.g., by applying a vacuum of less than 30 cm. Hg. It is preferred that the polyisocyanate be devolatilized before being mixed with the lactone.

The lactone and the polyisocyanate are present in the compositions according to the invention in equivalent ratios between 1:10 and 10:1. Depending upon this ratio, the cured products possess different properties. At ratios between 1:10 and 2:1 clear castings could be obtained, the hardness and softening temperature decreasing with increasing ratios. At ratios between 2.5:1 and 10:1 the castings become turbid. The higher the ratio in this range is, the higher the crystallinity, shrinkage and softening temperature will be. It will therefore depend upon the ultimate use which ratio is to be preferred. Thus, in highly filled systems where shrinkage is not very important, ratios above 2.5:1, preferably between 3:1 and 5:1, may be used. If clear castings and in particular if products of low shrinkage and high softening temperatures are desired, equivalent ratios between 1:2 and 1.5:1 are preferable.

The amount of initiator is usually within the range of 0.001–10% w. based on lactone plus polyisocyanate, the preferred amounts lying between 0.005 and 3% w.

Apart from the above three components (lactone, polyisocyanate, initiator) the compositions may contain further constituents such as sand, bitumen, coal tar, pigments, dyes, chopped fibers, polymers such as polyvinyl chloride, polystyrene and ethylene/propylene copolymers. Such fillers may suitably be used to increase the viscosity of the compositions, if desired. As such, i.e., without fillers, the compositions have very low viscosities making them especially useful for intricate castings, soil impregnation and the like.

During the curing step, temperature control is required in order that the compositions according to the invention be properly cured. Both the polyisocyanate and the lactone give an exothermic reaction during curing; the polyisocyanate starts curing before the lactone. During curing, the heat produced should not raise the temperature above the boiling point of the lactone (150° C.) as long as free lactone is present, and if no pressures above atmospheric are to be used. In a typical cure schedule for an unfilled composition containing pivalolactone/toluene diisocyanate (1/1) and a catalyst such as 1% w. of triphenylphosphine, it will be desirable that in the first 2 hours, especially within the first 3 to 24 hours, the curing temperature does not rise above 60° C., preferably not above 30° C. During this time curing sets in but the mixture usually remains fluid. The temperature may be gradually raised to 70–90° C. If the composition is highly filled, e.g., if it contains 50% w. of sand the cure may be started at higher temperatures, such as at 60–80° C. A postcure at elevated temperatures may subsequently be required to develop the properties of the cured compositions fully. For this purpose the temperature of the semicured composition may be raised to 100–200° C. for a period of ½ hour to 10 hours or more. With tetrahydrothiophene as initiator the advantage of lower curing temperatures may be obtained. Thus with 0.5% w. of tetrahydrothiothiophene a full cure may be obtained at room temperature with 16 hours; with 0.1% w. a cure of e.g., 16 hours at room temperature and 2 hours at 50° C. will suffice; while with 1% w. of this initiator an unfilled composition may start to boil as a result of the rapid curing rate.

The cure of the compositions according to the invention may be accelerated by adding 0.01–5% w. (based on lactone plus isocyanate), preferably 0.1–1% w., of a compound containing a hydroxyl group, preferably a phenolic hydroxy group, such as diphenylolpropane.

The invention is illustrated by the following examples. The reactants, their proportions and other specific ingredients of the formulations are presented as being typical and various modifications can be made in view of the foregoing disclosure without departing from the spirit or scope of the disclosure or of the claims.

EXAMPLES I to VI

In most examples the isocyanate used was toluene diisocyanate (TDI), i.e., a mixture of 2,4- and 2,6-toluene diisocyanates in a 80/20 isomer ratio. The TDI was devolatilized at 75° C. and a vacuum of 5 mm. Hg. The pivalolactone had been previously dried by distillation over 3% TDI. The compositions were devolatilized by applying a vacuum of 15 cm. Hg for 10 minutes at room temperature. A number of compositions were prepared and the properties of the cured bubble-free castings were determined. The main data are shown in the following table.

TABLE I

| Example | 1 | 2 | 3 | 4 | 5 | 6 |
|---|---|---|---|---|---|---|
| Lactone/TDI equivalent ratio | 1:2 | 1:1 | 2:1 | 3:1 | 4:1 | 6:1 |
| Initiator, 1% w | MBDMA | TPP | TPP | TPP | TPP | TPP |
| Cure schedule | (¹) | (²) | (²) | (²) | (²) | (²) |
| Casting properties | Clear | Clear | Clear | Turbid | Turbid | Turbid |
| Crystallinity, percent | 0 | 0 | 0 | 30 | 40 | 50 |
| Barcol hardness | 33 | 30 | 15 | 12 | 12 | 12 |
| Shore D hardness | | 90 | | | 85 | |
| Vicat temp., °C. at: | | | | | | |
| 0.1 mm | 135 | 115 | 61 | 80 | 118 | 138 |
| 1 mm | 220 | 218 | 145 | 177 | 190 | 200 |
| Notched Izod impact, kg. cm./cm.² | | 4.1 | | | 6.0 | |

[1] 16 h. RT plus 1 h. 50° C. plus 1 h. 100° C. plus 3 h. 150° C.
[2] 16 h. 50° C. plus 1 h. 75° C. plus 1 h. 100° C. plus 3 h 150° C.
Note.—h.=hour(s); MBDMA=α-methylbenzyl-dimethylamine; TPP=triphenyl-phosphine; RT=room temperature Some electrical properties of the casting of Example III (pivalolactone/TDI 2:1, 1% w. TPP) were determined:

| At a temperature of—, °C. | Dielectric constant at 10³ c./s. | Loss factor, at 10³ c./s., tg δ (×10⁻³) | Volume resistivity, ohms-cm. (×10⁻¹²) |
|---|---|---|---|
| 20 | 3.4 | 19 | 1,700 |
| 60 | 3.5 | 18 | 650 |
| 100 | 3.9 | 19 | 40 |
| 140 | 4.0 | 15 | 1.6 |
| 180 | 4.0 | 11 | 0.7 |
| 220 | 3.9 | 8 | 0.4 |

For purposes of comparison a further number of compositions were prepared:

(a) From TDI and 1% w. of MBDMA, without pivalolactone, cured according to the schedule of Example I, no casting was obtained, the product was still liquid;

(b) From TDI and β-propiolactone, or dihydropyranyl-β-propiolactone (equivalent ratios 1:1), initiated with 1% w. of MBDMA, and from TDI and β-trichloromethyl-β-propiolactone, initiated with 1% w. of TPP. All compositions showed severe and continuing gas formation, both at room temperature and at higher temperatures;

(c) Compositions containing TDI/pivalolactone (1:1) initiated with 1% w. of cetyltrimethylammonium bromide, triphenylbutylphosphonium bromide or tetrabutylphosphonium bromide. Again severe gas formulation was observed even at room temperature;

(d) TDI/pivalolactone (1:1) initiated with 1% w. of triphenylbismuthine, triphenylphosphine oxide, dibutyltin oxide or dibutyltindilaurate showed no or only a slight tendency to cure at room or higher temperatures.

EXAMPLES VII–XI

Pivalolactone/TDI (1:1) with 1% w. of dibutylsulfide, triphenylarsine or triphenylstibine, cured according to the schedule of Example I, gave hard and clear castings.

EXAMPLES X TO XIII

Pivalolactone/TDI (2:1) with 0.1% w. of tetramethylthiourea, 1% w. of tetramethylurea or 1% w. of tetramethylthiuram-monosulfide, cured for 24 hours at room temperature and at 50° C. for 5 days, gave hard and clear castings.

EXAMPLES XIV TO XVI

Compositions were prepared consisting of pivalolactone/TDI (1:1), 1% w. of TPP and either 90% w. of sand, or 30% w. of bitumen, or 10% w. of polyvinyl chloride (K-value 61) or 30% w. of a vinyl chloride/vinyl acetate copolymer (87/13, K-value 33). When cured according to Example I, they gave hard castings.

EXAMPLE XVII

A 1:1 equivalent mixture of pivalolactone/TDI containing 1% w. of MBDMA and 2% w. of isopropanol cured in 30 minutes at 45° C. to a jelly-like mass; without the isopropanol it took 2–3 hours for the mixture to reach the same stage.

EXAMPLE XVIII

To 1:1 equivalent mixtures of pivalolactone/TDI were added 0.5% w. and 0.1% w. of tetrahydrothiophene, respectively, hard, clear and colorfree castings were obtained having the following properties:

| Tetrahydrothiophene added, percent weight | 0.5 | 0.1 |
|---|---|---|
| Cure schedule | (¹) | (²) |
| Barcol hardness | 28 | 15 |
| Vicat softening temperature, °C., at: | | |
| 0.1 mm | 74 | 65 |
| 0.2 mm | 90 | 78 |
| 0.5 mm | 120 | 120 |
| 1.0 mm | 162 | 178 |

[1] 16 hours at room temperature.
[2] 16 hours at room temperature plus 2 hours at 50° C.

When heating the castings for 3 hours at 180° C. no color developed, an indication of good thermostability, while the hardness and impact strength increased.

EXAMPLE XIX

A composition was prepared consisting of 85% w. of dry sand and 15% w. of a pivalolactone/TDI (1:1) mixture containing 1% w. of tetrahydrothiophene. Overnight curing at room temperature gave a hard, coherent casting. At room temperature the mixture containing 1% w. of tetrahydrothiophene had a potlife of about 20–30 minutes.

EXAMPLE XX

A similar mixture (40% w.) as used in the previous example was employed to impregnate 60% w. of glass fiber. When kept in a steel mold at room temperature for 10 hours, a hard laminate was obtained. Instead of the glass fiber a fabric from polypivalolactone fibers may be used.

EXAMPLE XXI

A composition was prepared consisting of 30% w. of a vinylacetate/vinylchloride copolymer (13/87; K-value 33; substantially free of hydroxyl groups) and 70% w. of a mixture of pivalolactone/TDI (1:1) containing 0.5% w. of tetrahydrothiophene. The composition had a viscosity of 10 poises. When brushed upon steel panels, hard coatings were obtained in 1 day at room temperature.

EXAMPLE XXII

A 4:1 pivalolactone/TDI mixture containing 0.1% w. of tetrahydrothiophene was used to impregnate fir wood for 1 hour under vacuum at room temperature. The fir wood was subsequently soaked for another hour in the mixture at atmospheric pressure and then cured for 2 hours at 50° C. The wood possessed a very low water absorption and was dimensionally stable when soaked in water for 2 days.

The same mixture and curing schedule may also be used in the impregnation or manufacture of soft and hard board or card board.

EXAMPLE XXIII

A 1:1 pivalolactone/TDI mixture containing 1% w. of dimethylsulfoxide was used to soak a cotton fabric. After centrifuging off excess liquid the fabric was heated at 100° C. for 10 minutes and at 180° C. for another 10 minutes. A crease-proof fabric was obtained.

EXAMPLES XXIVa-d

In these examples various mixtures of TDI and hexamethylene diisocyanate (HDI) were used as organic polyisocyanate. Further conditions and properties of the castings obtained, appear from the following table.

TABLE 2

| | Example 24 | | | |
|---|---|---|---|---|
| | (a) | (b) | (c) | (d) |
| TDI, moles | 1 | 1 | 1 | 1 |
| HDI, moles | 3 | 1 | 0.5 | 0.25 |
| Pivalolactone, moles | 8 | 2 | 2 | 2 |
| Catalyst, TPP %w | 1 | 1 | 1 | 1 |
| Cure schedule | 4 hrs. RT plus 16 hrs. 45° C. plus 1 hr. 100° C. plus 3 hrs. 150° C. | | | |
| Casting properties: | | | | |
| appearance | (¹) | (²) | (³) | (³) |
| Barcol hardness | 0 | 0 | 3 | 25 |
| Shore D hardness | 60 | 82 | 86 | 87 |
| Vicat softening temperature, ° C., at penetration of: | | | | |
| 0.1 mm | 50 | 44 | 51 | 81 |
| 0.2 mm | 75 | 51 | 64 | 105 |
| 0.5 mm | 110 | 73 | 110 | 145 |
| 1.0 mm | 150 | 95 | 150 | 180 |
| Crystallinity | (⁴) | ----- | (⁵) | (⁵) |

¹ Yellow hazy. ² Somewhat hazy. ³ Clear. ⁴ Very high. ⁵ None.

I claim as my invention:

1. A composition comprising an $\alpha,\alpha$-dialkyl-$\beta$-lactone and an organic polyisocyanate in an equivalent ratio between 1:10 and 10:1, and in addition between 0.005 and 3%w., based on lactone plus polyisocyanate of an anionic initiator which (a) is a compound containing an atom of an element of Group V-A or VI-A of the Periodic Table, which atom has an oxidation state of not more than 4 and an electronegativity of not more than 3.2 and an atomic number between 7 and 52; and (b) contains at least 2 bonds between said atom and an organic radical carbon atom.

2. A composition as in claim 1 wherein the initiator contains an atom of trivalent nitrogen or phosphorus or of divalent sulfur.

3. A composition as in claim 1 wherein the initiator has the general formula

$X_1$ representing the Group V-A element and $R_1$, $R_2$ and $R_3$ an organic radical having 1 to 12 carbon atoms bound to $X_1$ by a C-$X_1$ bond, while $R_1$ and $R_2$ together may also form a divalent organic radical.

4. A composition as in claim 1 wherein the initiator has the general formula

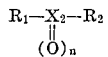

$X_2$ representing the Group VI-A element, $R_1$ and $R_2$ an organic radical having 1-12 carbon atoms bound to $X_2$ by a C-$X_2$ bond while $R_1$ and $R_2$ together may also form a divalent organic radical, and $n$ the integer 1 or zero.

5. A composition as in claim 1 wherein the initiator is from the group consisting of aliphatic tertiary amines having at least 2 alkyl groups of not more than 4 carbon atoms each, tertiary phosphines, aliphatic sulfides and aliphatic sulfoxides.

6. A composition as in claim 1 wherein the lactone has the formula

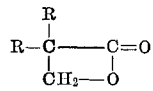

wherein the alkyl groups R have 1 to 4 carbon atoms each.

7. A composition as in claim 6 wherein the lactone is pivalolactone.

8. A composition as in claim 1 in which the polyisocyanate is an aromatic diisocyanate.

9. A composition as in claim 1 wherein the polyisocyanate used is a mixture of an aliphatic and an aromatic polyisocyanate in weight ratio below about 10:1.

10. A composition according to claim 1 containing a filler.

11. A composition as in claim 1 comprising 0.01–5% by weight based on lactone plus isocyanate of a compound containing a hydroxyl group as accelerator.

12. A cured composition according to claim 1.

References Cited

FOREIGN PATENTS 381,499 2/1963 Japan _____ 260—77.5
6,414,516 6/1966 Netherlands _____ 260—78.3

OTHER REFERENCES

Toyo: Chem. Abstracts, vol. 59, 7675f.
Shell: Chem. Abstracts, vol. 65, 17081c, 1966.

DONALD E. CZAJA, Primary Examiner

M. J. WELSH, Assistant Examiner

U.S. Cl. X.R.

117—126, 128.4, 139.4, 148; 252—182, 188.3; 260—37, 78.3